Feb. 11, 1958    R. A. LAMBERTSON    2,822,925
FILTERS FOR AQUARIA
Filed Jan. 16, 1956    5 Sheets-Sheet 1
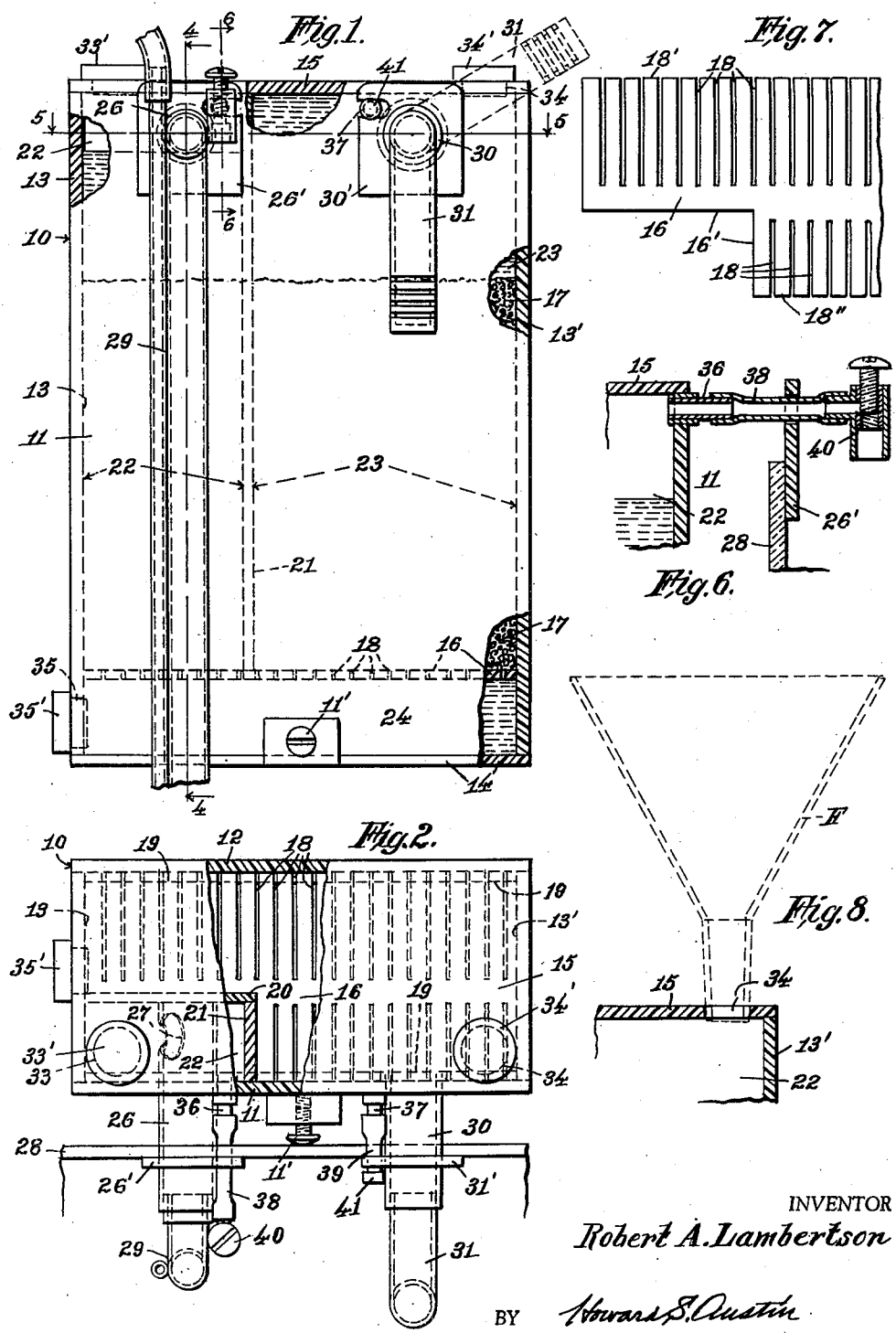
INVENTOR
Robert A. Lambertson
BY Howard S. Austin
ATTORNEY

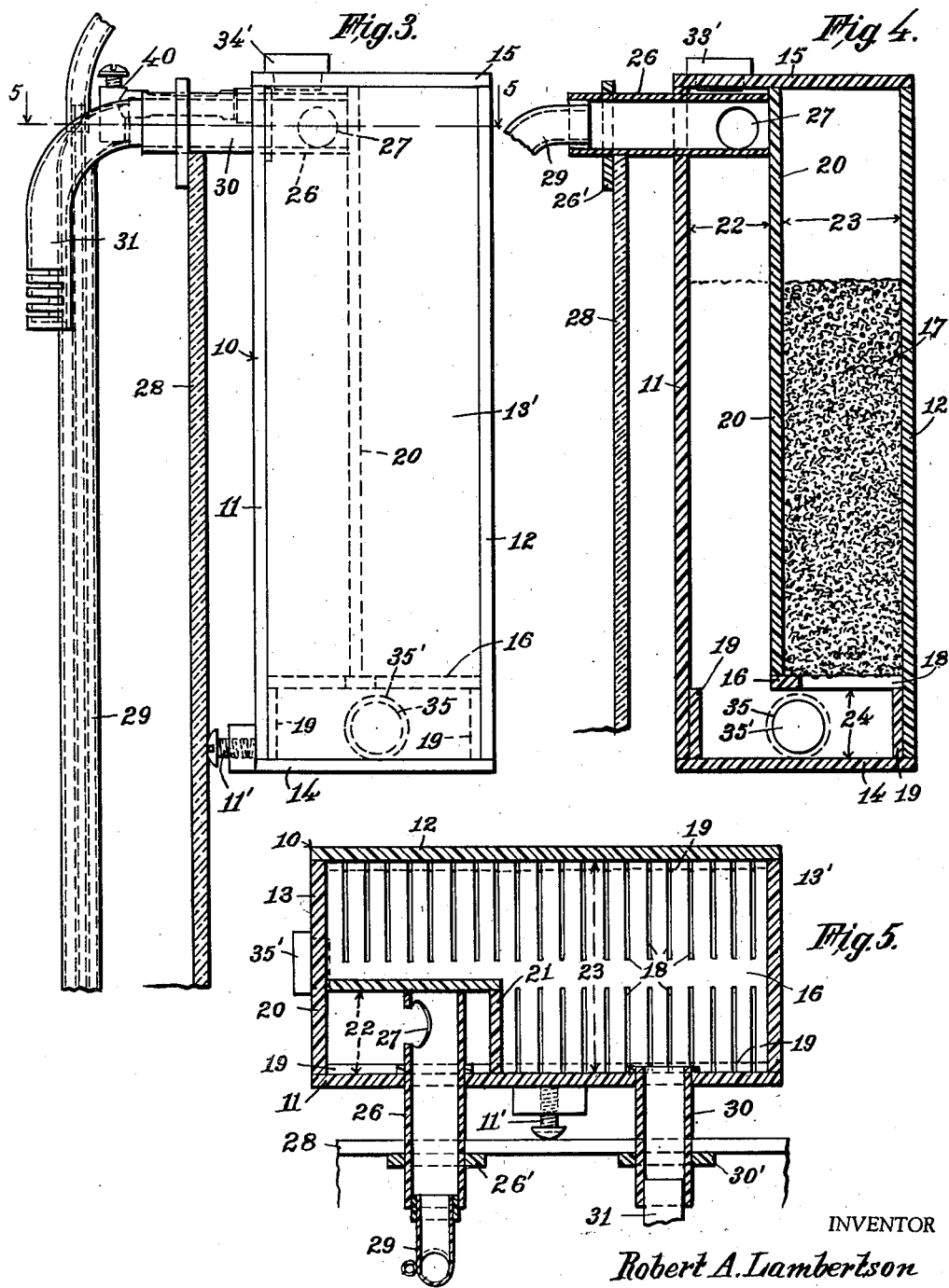

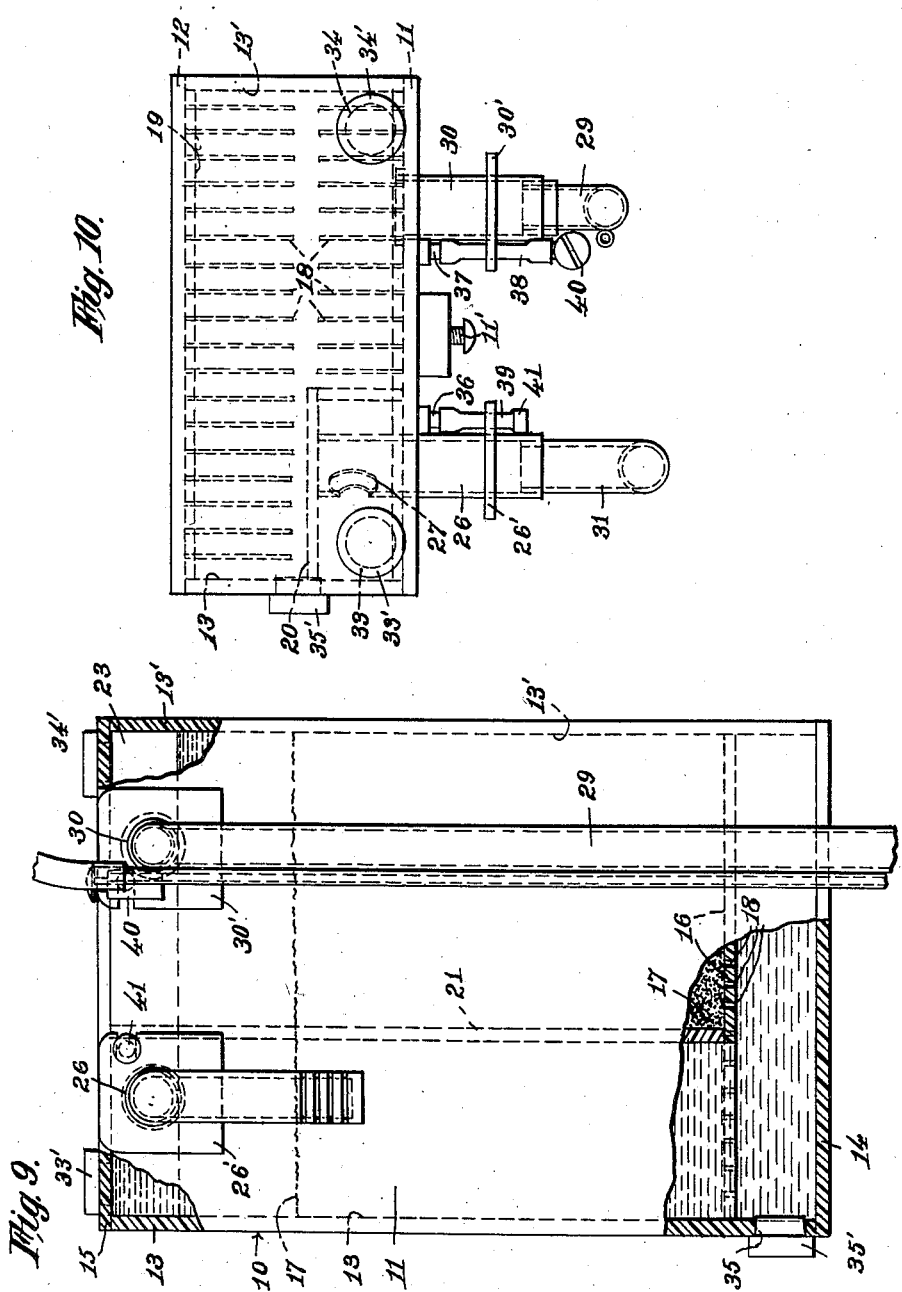

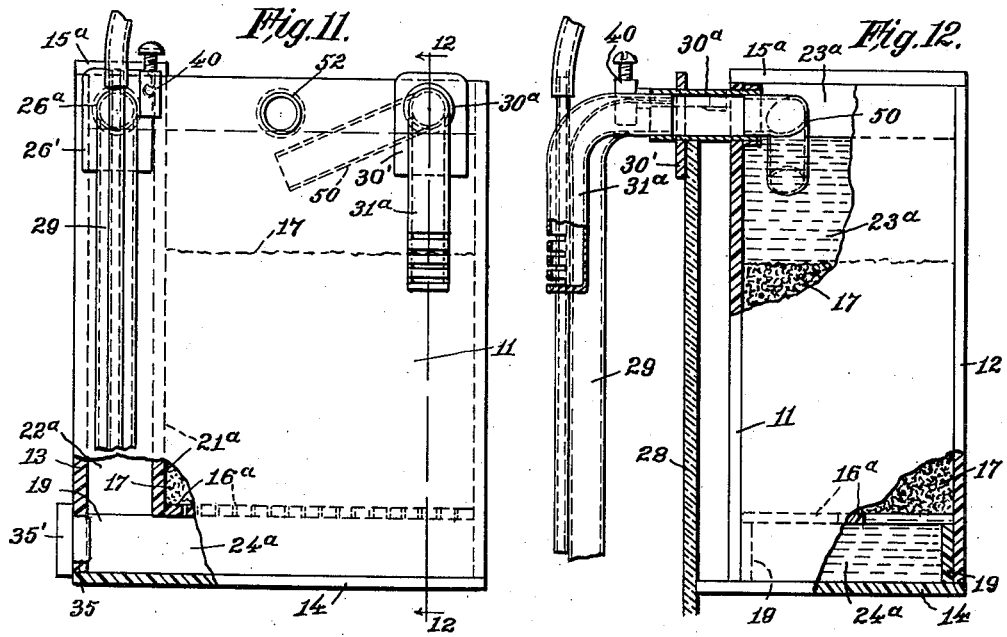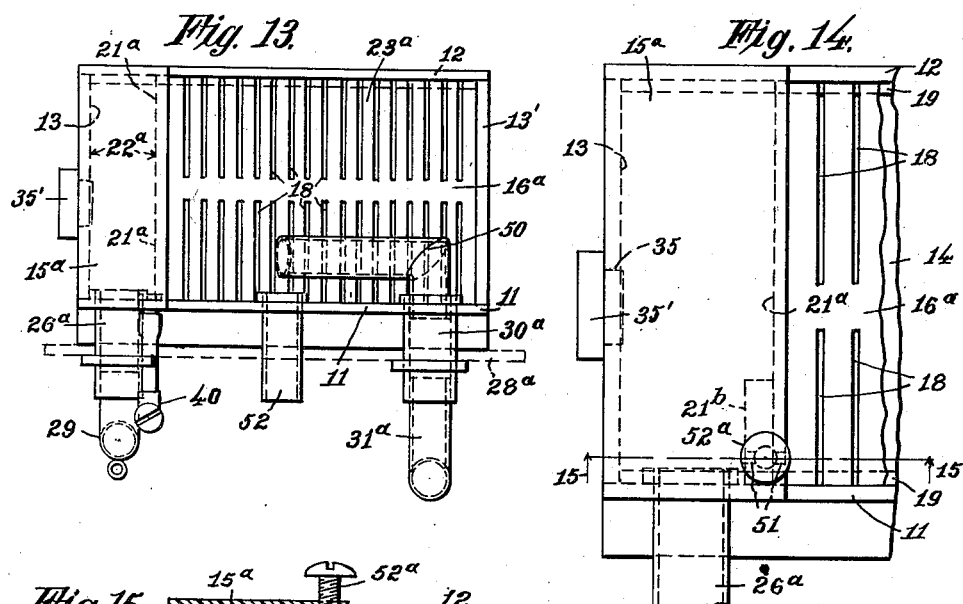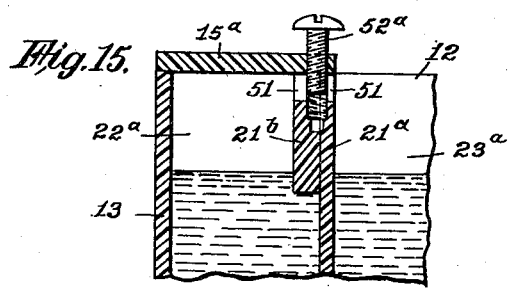

Feb. 11, 1958 R. A. LAMBERTSON 2,822,925
FILTERS FOR AQUARIA
Filed Jan. 16, 1956 5 Sheets-Sheet 5
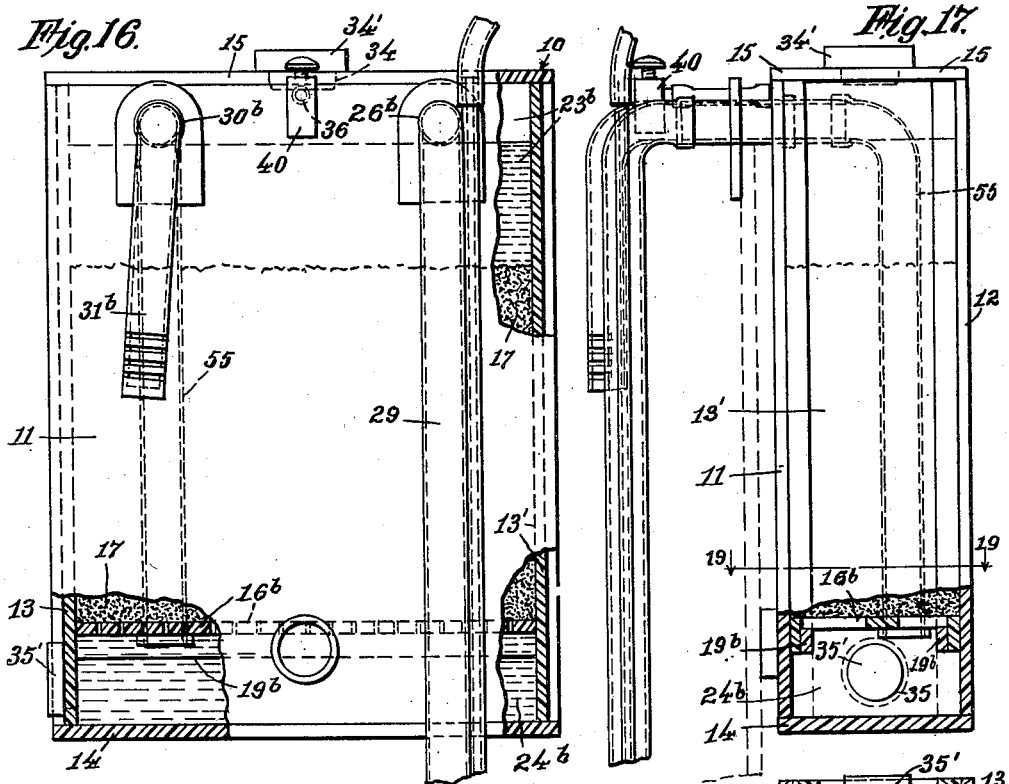
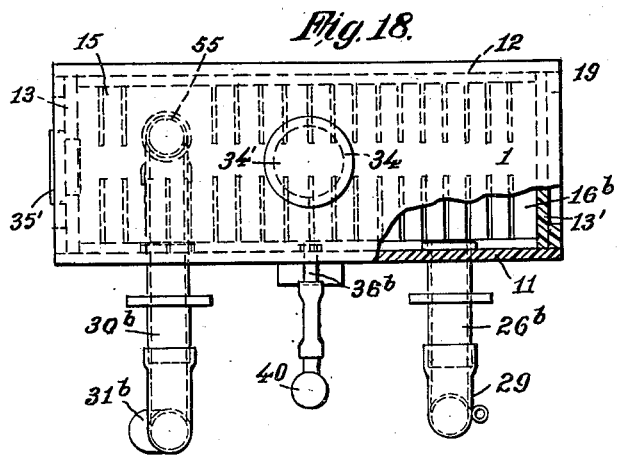
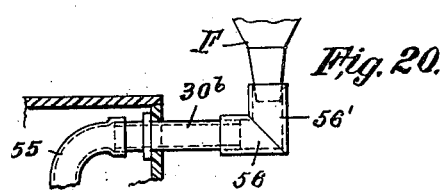
INVENTOR
Robert A. Lambertson
BY Howard S. Austin
ATTORNEY

United States Patent Office 2,822,925
Patented Feb. 11, 1958

2,822,925

FILTERS FOR AQUARIA

Robert A. Lambertson, Winston-Salem, N. C.

Application January 16, 1956, Serial No. 559,182

12 Claims. (Cl. 210—169)

This invention relates to filters particularly adapted for maintaining the water of aquaria in a clean and wholesome condition. More particularly the invention relates to the type of filters to which the foul water is delivered from the aquarium to the filter by means of an air-lift, and from which it is preferably returned to the aquarium by syphoning.

An object of the present invention is to provide a filter of the type stated in which a maximum amount of water may be filtered in proportion to the volume of air delivered to the air-lift.

A further object of the invention is to provide a filter which will process a large quantity of water with practically no noise.

A further and particular object of the invention is to provide a filter as stated wherein the air delivered to the filter with the water to be filtered is utilized to assist in forcing the water through the filter material.

A further object is to provide, in a filter as above stated, means for regulating the air pressure in the filter.

A further object of the invention is to provide a filter which may be arranged to operate either as a bottom feed filter or as a top feed filter.

Other objects will appear hereinafter.

With the above stated objects in view, the filter embodying the invention consists generally in a housing adapted to be arranged adjacent a wall of an aquarium and comprising substantially vertical retaining walls and a bottom, a foraminate plate spaced above the bottom to support suitable filter material, a vertical chamber within said housing and air-sealed at the upper end thereof, an air-lift for discharging water from the aquarium to said chamber, means for maintaining a uniform air pressure in said chamber, and means for returning the filtered water to the aquarium.

The construction of the filter may be such as to constitute a bottom feed filter wherein the water to be filtered is delivered from the aquarium to the filter housing below the filter material so as to pass upwardly therethrough, and the filtered water returned to the aquarium preferably by syphonic action; or the construction may be such as to constitute a top feed filter wherein the water from the aquarium is delivered to the upper portion of the housing above the filter material to percolate downwardly therethrough, and the filtered water returned to the aquarium by any suitable means, such as a syphon or other delivery duct. Preferably the construction of the device is such that the same may be used either as a bottom feed filter or as a top feed filter by a mere interchange of a few external component parts.

The invention further consists in various details of construction and arrangement of parts as will be fully described hereinafter and particularly pointed out in the claims.

The invention will be more readily understood by reference to the accompanying drawings, in which, Fig. 1 is a front elevation of a filter embodying the preferred form of the invention, the parts being arranged to constitute a bottom feed filter;

Fig. 2 is a top plan view of the same with a portion of the top plate broken away;

Fig. 3 is a side elevation thereof, and illustrated as supported upon an aquarium wall;

Fig. 4 is a vertical section on the line 4—4 of Fig. 1;

Fig. 5 is a horizontal section taken on the line 5—5 of Figs. 1 and 3;

Fig. 6 is a detail section on an enlarged scale, taken in the line 6—6 of Fig. 1, and illustrating an adjustable air escape valve for maintaining constant uniform pressure in the water receiving chamber;

Fig. 7 is a detail plan view, partly broken away, of the foraminate plate for supporting the filter material;

Fig. 8 is a detail view illustrating a means which may be employed for introducing the filter material into the body of the device;

Fig. 9 is a front elevation of the device illustrated in Figs. 1 to 8 inclusive, with the positions of several of the elements, including the air lift and the siphon, transposed to constitute a top feed filter;

Fig. 10 is a top plan view of the arrangement illustrated in Fig. 9;

Fig. 11 is a front elevation of a modified form of the invention to be used solely as a bottom feed filter;

Fig. 12 is a side elevation of the same, parts thereof being illustrated in section taken substantially on the line 12—12 of Fig. 11;

Fig. 13 is a top plan view of the same;

Fig. 14 is a plan view of the receiving portion of the device illustrated in Figs. 11, 12 and 13, upon a much enlarged scale, illustrating a modified form of air pressure control;

Fig. 15 is a detail section on the line 15—15 of Fig. 14;

Fig. 16 is a further modification of the invention designed to be used solely as a top feed filter;

Fig. 17 is a side elevation of the same, portions being illustrated in section;

Fig. 18 is a top plan view of the form illustrated in Figs. 16 and 17;

Fig. 19 is a horizontal section on the line 19—19 of Fig. 17; and

Fig. 20 is a detail view on substantially the line 20—20 of Fig. 18, illustrating a means for back washing the filter illustrated in Figs. 16 to 19.

Referring particularly to Figs. 1 to 8 of the drawings, 10 indicates generally the body of the filter, which body comprises a front wall 11, a rear wall 12, side walls 13 and 13', a bottom member 14, and a top plate 15. The walls 11, 12, 13 and 13' constitute the vertical retaining walls for the filter material and for the water in the several chambers hereinafter described. Spaced above the bottom plate 14 is foraminate plate 16 adapted to support filter material 17, such as granular carbon. Preferably the foramina consist of narrow parallel slots 18 extending inwardly from the longitudinal edges 18' and 18'' of said plate, as illustrated particularly in Fig. 7; and the edge portions of said plate rest upon longitudinal supporting strips 19. Extending upwardly from plate 16 to the top plate 15 is a partition comprising angularly disposed plates 20 and 21, which divide the space above the plate 16 into a pair of vertical chambers 22 and 23; and the foraminate plate 16 below the chamber 22 is cut away, as at 16' in Fig. 7, so that said chamber 22 is in open communication with a chamber 24 formed below the plate 16.

Extending through the front wall 11 and into the upper end of chamber 22, is a horizontal tubular duct 26, the inner end of which abuts, and is closed by, the wall 20 of chamber 22. The portion of said tubular duct 26 within the chamber 22 is provided with a lateral aperture 27 which forms an open communication between said duct and said chamber. The aperture 27 is positioned to extend to the bottom portion of duct 26 so that said duct is completely drained and no water can accumulate therein. The outer end of said tubular duct projects forwardly of the wall 11 to rest upon the upper edge of the adjacent wall 28 of the aquarium. Detachably secured to the outer forward end of the duct 26 is an air-lift 29 which may be of any preferred type.

A similar tubular duct 30 is fixed in the wall 11 and communicates with chamber 23. The duct 30 extends forwardly approximately the same distance as the duct 26, and is arranged at the same level therewith so as to rest upon the aquarium wall; said tubular ducts 26 and 30 thereby constituting means for supporting the filter in operative position. Detachably mounted upon the outer end of duct 30 is a delivery leg 31 for returning the water to the aquarium after it has been filtered.

Frictionally mounted upon the tubular ducts 26 and 30 are depending positioning members 26' and 30' which engage the inner face of the aquarium wall; and an adjustable member 11' extending forwardly from the lower portion of the filter housing into engagement with the outer face of the aquarium wall, provide means to plumb the filter.

Apertures 33 and 34 are provided in the top plate 15 above the chambers 22 and 23 respectively; and said apertures are normally tightly closed, when the device is in operation, by stoppers 33' and 34' respectively. A similar aperture 35 is provided in the side wall 13 below the level of the foraminate plate 16, and is tightly closed by a stopper 35'. The purpose of said apertures will appear hereinafter.

Small caliber tubular ducts 36 and 37 extend through the front wall 11 and communicate with the upper portions of the chambers 22 and 23 respectively; and interchangeably mounted on the outer ends of said ducts are short, preferably flexible tubes 38 and 39. The tube 38 is provided with an air-bleeder valve 40; and the tube 39 is tightly closed by any preferred means, such as a cap 41, thereby constituting a closure for the duct to which it is applied.

The filtering material 17 is introduced through the aperture 34 by any desired means. This can be readily and quickly accomplished by means of a funnel F, such as illustrated in dotted lines in Fig. 8. When using the funnel for this purpose the stoppers 34' and 35' are removed, the stem of the funnel inserted in the aperture 34, and the granular carbon fed to the funnel. A small flow of water into the funnel will quickly carry the carbon into the chamber 23, the surplus water escaping through the opened aperture 35. After the chamber 23 has been supplied with an ample amount of carbon, the plugs 34' and 35' are replaced, and the filter arranged on the aquarium as illustrated in Figs. 2 to 5 inclusive.

After the filter is in position on the aquarium, the air-lift is connected to the source of air supply and the air lift 29 started into operation to deliver the foul water from the aquarium to the filter. The air and water from the airlift enter the chamber 22 through the aperture 27 in duct 26, and the water passes downwardly into the lower chamber 24 and gradually rises in the chambers 22 and 23; while the air accumulates in the air-tight upper end of chamber 22. The water rising in chamber 23 passes through the carbon 17, and when it reaches the upper end of said chamber 23 it will flow through tubular duct 30 and delivery tube 31 into the aquarium. If it is desired to siphon the water from the chamber 23, the delivery tube 31 is raised as indicated in dotted lines in Fig. 1 until the chamber is filled and the water enters the duct 30. Upon returning the delivery tube to substantially the position shown in full lines, the water will be siphoned back into the aquarium at a greater speed; the upper end of said chamber being airtight, said chamber will constitute the ascending leg of the siphon.

As above stated, the air from the air lift will accumulate in the upper end of chamber 22 which, in excess, would impede the action of the device. Means are therefore provided to maintain a maximum free flow of water through the filter and back into the aquarium. It is to this end that the bleeder valve 40 is provided. By careful adjustment of this valve the level of the water in chamber 22 may be kept constantly at substantially the level of the lowermost portion of the edge of the aperture 27, and the air above the water in said chamber 22 will be maintained at sufficient pressure to force the water upwardly through the carbon 17 to the top of chamber 23; and being maintained entirely below the aperture 27, the water in said chamber will not form a water resistance to the water entering from the air-lift. It should be noted that the air bleeder valve is preferably located above the aquarium so that any drip therefrom will be caught in the aquarium.

Figs. 9 and 10 illustrate the same filter as shown in Figs. 1 to 8 inclusive, but arranged as a top-feed filter by merely transposing the positions of the air-lift 29 and the return arm 30; together with the transposition of the bleeder valve 40 and the closure member 39—41. With this arrangement, the foul water from the aquarium will be delivered to the filter chamber 23 above the filter material 17, to percolate downwardly therethrough into the bottom chamber 24 and then upwardly in chamber 22, from whence it is returned to the aquarium through the arm 26. It will be noted that the desired air pressure and water level in chamber 23, which is now the receiving chamber, are maintained by means of the air bleeder valve 40. Also, the chamber 22 is filled to the top thereof with water, so that said chamber will serve as the ascending leg of a delivery siphon, the delivery tube 30 being the descending leg thereof, which will increase the efficiency of the air lift.

To clean the filter after having been used as a bottom feed filter, the air-lift 29 and delivery leg 30 are first removed from the tubular ducts 26 and 30 respectively, and the stopper 34' above the filter chamber 23, and the stopper 35' from the end of chamber 24 are removed. Water is then introduced through the aperture 34 to flush downwardly through the carbon and out through the aperture 35, carrying the filter with it. After the flushing has been completed, a brush may be inserted through apertures 33 and 35 to clean the inner faces of the walls of chambers 22 and 24.

To back-wash or clean the filter after having been used as a top feed filter, it is only necessary to remove the stopper 33' at the upper end of small chamber 22, and place said stopper in the outer end of duct 26; and then admit a stream of water through aperture 33. The water will pass downwardly through chamber 24, then upwardly through the foraminate plate 16 and the carbon in chamber 24, and discharge through tubular duct 30.

In the modified form of the invention as illustrated in Figs. 11 to 15 inclusive, the device is designed to be used solely as a bottom feed filter. In this form, the chamber 22$^a$, which constitutes the only receiving chamber, extends from the front wall 11 to the rear wall 12, and is preferably of less width than in the form above described. Also, in the present modified form, only said chamber 22$^a$ is provided with an air-tight top closure plate 15$^a$; the filter chamber 23$^a$ being uncovered.

Referring to Figs. 11 to 13, the front wall 11, rear wall 12, side walls 13 and 13', and the bottom plate 14 are substantially the same as shown in Figs. 1 to 10. The partition wall 21$^a$ extends from the front wall 11 to the rear wall 12; and the foraminate plate 16$^a$ extends from the lower edge of wall 21ª to the side wall 13', separating the filter chamber 23ª from the bottom chamber 24ª.

Extending through the front wall 11 adjacent the upper edge thereof, are tubular ducts 26ª and 30ª communicating with the upper portions of chambers 22ª and 23ª respectively. Said ducts are positioned with their lower edges at the same level so as to rest upon the upper edge of an adjacent aquarium wall 28, as shown in Fig. 12. An air lift 29, of any preferred type, is attached to the outer end of duct 26ª to convey the foul water from the aquarium to the upper end of chamber 22ª; and a downwardly curved delivery leg 31ª is mounted upon the outer end of duct 30ª to extend downwardly into the aquarium and deliver the filtered water thereto.

It may, at times, be desirable to siphon the filtered water from the upper portion of the filter chamber 23ª, and to this end an angularly disposed tube 50 is mounted on the inner end of duct 30ª and through which the filtered water is delivered to leg 31ª; and said leg 31ª is angularly adjustable on the outer end of duct 30ª, in the same manner as illustrated in Fig. 1, so that it may be turned upwardly until the water enters the same, and then turned downwardly as it fills, until it is in substantially the position shown in Figs. 11 to 13, thereby starting siphonic action. The tube 50 is arranged with the open lower end 50ª thereof terminating below the water level in chamber 23ª and sufficiently above the upper surface of the filter material to avoid any of said material from being sucked therethrough. The desired air pressure is maintained in the upper end of chamber 22ª by means of the valve 40, as in the form illustrated in Figs. 1 to 10 inclusive.

In order to avoid overflow of the filter, should the siphonic action be stopped from any cause, a safety discharge tube 52 is provided which may be positioned midway between the ducts 26ª and 30ª, to discharge the water accumulating in the top portion of the filter chamber into the aquarium. This tube 52 will not interfere with the siphonic action above described as it is above the level of the water in the filter during such operation. When rotating the siphon leg 31ª, the end of tube 52 may be closed, as by means of a finger, until the water has risen sufficiently into said leg.

A modified form of bleeder valve particularly adapted for use with the construction disclosed in Figs. 11 to 13 of the drawings, is illustrated in Figs. 14 and 15. As shown therein, a port 51 extends through the wall 21ª at or adjacent the upper end thereof, and an adjustable screw valve 52ª is provided to control said port to maintain the desired air pressure in the upper end of chamber 22ª. The adjacent portion of the wall 21ª may be thickened as at 21ᵇ to provide ample room for the valve 52ª. By this arrangement, should any water enter the port 51, and pass the valve 52ª, it will be discharged into the upper portion of filter chamber 23ª.

The lower portion of the wall 13 is provided with the clean-out aperture 35, and stopper 35' for the same, as in the preferred form of the invention. The upper end of filter chamber 23ª being open, the filter material may be readily placed therein, and also removed therefrom as desired. To back-wash it is only necessary to remove stopper 35' and run water, as from a faucet, into the open upper end of the filter chamber 23ª.

In Figs. 16 to 19 inclusive, of the drawings, a further modification is illustrated, wherein the invention is shown as applied to a filter designed to be used solely as a top feed filter. In this form of the invention the vertical retaining walls 11, 12, 13 and 13' of the housing 10, together with the bottom plate 14 and top plate 15, are substantially the same as illustrated in the preferred form. The vertical partition walls 20 and 21 are omitted, and the horizontal foraminate plate 16ᵇ divides the body of the filter into the upper filter chamber 23ᵇ and the bottom chamber 24ᵇ, said plate 16ᵇ being supported upon longitudinal members 19ᵇ secured to the front and back walls of the device. The filling aperture 34 and stopper 34' are provided in the top plate 15; and the flush-out aperture 35 and stopper 35' are provided in the wall 13 below the foraminate plate 16.

Tubular ducts 26ᵇ and 30ᵇ extend through the front wall 11, and an air lift 29 is attached to the outer end of duct 26ᵇ to deliver the foul water from the aquarium to the housing above the filter material 17. Attached to the inner end of duct 30ᵇ is a substantially vertical siphon leg 55, the lower end of which is fixed in the plate 16ᵇ and communicates with the lower chamber 24ᵇ. The delivery leg 31ᵇ of the siphon is attached to the outer end of duct 30ᵇ and is adapted to extend downwardly into the aquarium as hereinbefore described. The air duct 36 extends forwardly from the housing close to the top thereof, and is provided with the air bleeder valve 40, whereby the air pressure and water level in the upper end of the housing may be maintained as desired.

In this form of the invention the entire upper portion of the housing 10 constitutes the air-tight receiving chamber into which the foul water from the aquarium is delivered by the air-lift; and the air pressure developed therein forces the water downwardly through the filter material 17 more quickly than by mere gravitational percolation. This pressure also tends to force the filtered water upwardly from the lower chamber 24ᵇ through the leg 55, and the tubular duct 30ᵇ to the delivery leg 31ᵇ, by which it is returned to the aquarium.

To clean the form of the device as illustrated in Figs. 16 to 20 inclusive, the delivery leg 31ᵇ is removed from the duct 30ᵇ, and a tubular elbow 56 is attached as illustrated in Fig. 20. The spout of a funnel F is then inserted in the upturned leg 56 of the elbow, and water is admitted through the funnel. This water thus admitted will pass downwardly through the siphon leg 55 into the lower chamber 24ᵇ, then upwardly through the foraminate plate 16ᵇ, the filter material 17, and discharge through the duct 26ᵇ.

The principle of operation of each of the forms of the invention above described and as illustrated in the drawings is substantially the same. The foul water from the aquarium is delivered by means of an air-lift to the upper portion of an air-tight chamber; and the accumulated air delivered thereto with the water creates a pressure in said chamber which forces the water through the filter material, and the filtered water is returned to the aquarium either by gravitational flow or by siphonic means. As the volume of air delivered by the air-lift is much greater than necessary to accomplish its function with the filter housing, and as such excess would interfere with the proper operation of the device, the bleeder valve 40 is provided, by means of which the quantity and pressure of air in the upper portion of the receiving chamber, together with the desired water level therein, may be nicely regulated.

I claim:

1. A filter of the class described comprising a housing adapted to be arranged adjacent an aquarium, said housing having substantially vertical retaining walls and a bottom, a foraminate plate spaced above said bottom and adapted to support filter material, a vertical chamber within said housing and air-sealed at the upper end thereof, an air-lift for discharging water from the aquarium to said chamber, means for maintaining a uniform air pressure in said chamber, and means for delivering the filtered water to the aquarium.

2. A filter of the class described comprising a housing adapted to be arranged adjacent an aquarium, said housing having substantially vertical retaining walls and a bottom, a foraminate plate spaced above said bottom to support filter material, a vertical receiving chamber within said housing and air-sealed at the upper end thereof, an air-lift for delivering water from the aquarium to said chamber, an air escape duct leading from the upper portion of said chamber, a valve for regulating the discharge of air through said duct, and means for delivering the filtered water to the aquarium.

3. A filter for an aquarium of the class described comprising a housing having retaining walls and a bottom, a foraminate plate spaced above said bottom, a vertical chamber within said housing and air-sealed at the upper end thereof, an air-lift for discharging water from the aquarium to said chamber, an air escape duct leading from the upper portion of said chamber, a valve controlling said duct to regulate the air pressure in said chamber, and a syphonic means for returning the water when filtered, to the aquarium.

4. A filter for an aquarium of the class described comprising a housing having retaining walls and a bottom, a foraminate plate spaced above said bottom to support filter material and forming a bottom chamber below the filtering material, a vertical partition extending upwardly from said foraminate plate and dividing said housing above said plate into a vertical receiving chamber and a filter chamber, a top member air-sealing the upper end of said receiving chamber, an air-lift for delivering the foul water from the aquarium to said receiving chamber, valve controlled means for controlling the air pressure in the upper end of said receiving chamber, and means for returning the water to the aquarium after filtration.

5. A filter of the class described comprising a housing including substantially vertical front, rear and side walls, a bottom and a top member, a horizontally disposed foraminate plate spaced above said bottom forming a bottom chamber below said plate, a vertical partition dividing the space above said foraminate plate into a receiving chamber and a filter chamber, filter material in the last said chamber and supported upon said foraminate plate, and the receiving chamber being in open communication at the lower end thereof with said bottom chamber, a pair of horizontal tubular ducts projecting forwardly from said front wall and communicating with the upper ends of said receiving chamber and said filter chamber respectively, an air lift and a tubular delivery leg interchangeably mounted on the outer ends of said ducts respectively, small vent ducts communicating with the upper ends of said chambers respectively, an air valve member and a plug member interchangeably mounted upon the outer ends of said vent ducts.

6. A filter for an aquarium of the class described, comprising a housing consisting of a front wall, a rear wall, side walls, a bottom and a top member, a horizontal foraminate plate spaced above said bottom forming a bottom chamber below said plate, a vertical partition dividing the housing above said foraminate plate into a receiving chamber and a filter chamber, said receiving chamber being in open communication with said bottom chamber, said partition comprising a pair of angularly disposed walls, one of said walls being parallel with said front wall, a tubular duct extending through said front wall and into the upper portion of said receiving chamber with the inner end thereof abutting and closed by the last said partition wall, a laterally disposed aperture in said duct within said chamber, an air-lift connected to the outer end of said duct, an air bleeder duct communicating with the upper end of said receiving chamber, a tubular duct extending through said front wall and communicating with the upper portion of said filter chamber, and a discharge member attached to the outer end of the last said duct to return the water when filtered to the aquarium.

7. In a filter of the class described, a housing comprising a front wall, a back wall, side walls and a bottom, a vertical partition wall fitting between said front and back walls and spaced from one of said side walls, said partition wall terminating above said bottom, a horizontal foraminate plate extending from the lower edge of said partition wall to the remote side wall forming a bottom chamber below said plate, said partition wall dividing said housing above said plate into a receiving chamber and a filter chamber, a top plate sealing the upper end of said receiving chamber, a forwardly projecting tubular duct fixed in said front wall and opening into said receiving chamber adjacent the upper end thereof, an air-lift mounted on the outer end of said duct, an air bleeder duct communicating with the upper end of said receiving chamber, an adjustable valve for said bleeder duct, a second forwardly projecting tubular duct communicating with the upper portion of said filter chamber, an angularly disposed siphon leg on the inner end of the last said duct, and a downwardly extending delivery leg on the outer end of said duct.

8. A filter as set forth in claim 7 in which the delivery leg of the siphon is rotatably adjustable on the outer end of delivery duct to which it is attached.

9. In a filter of the class described, a housing comprising a front wall, a back wall, side walls and a bottom, a vertical partition wall fitting between said front and back walls and spaced from one of said side walls, forming a receiving chamber and a filter chamber, a horizontal foraminate filter supporting plate spaced from said bottom forming a bottom chamber in open communication with said receiving chamber, an air lift for delivering water to said receiving chamber, a delivery tube for delivering the filtered water from said filter chamber, a top plate air-sealing the upper end of said receiving chamber, said partition wall having an air port below said top plate and forming an air bleeder duct from said receiving chamber to said filter chamber, and a screw threaded downwardly through said top plate and port forming a valve for regulating the air pressure in said receiving chamber.

10. A filter of the class described, comprising a housing consisting of a front wall, a rear wall, side walls, a bottom and a top plate air-sealing the upper portion of said housing, a horizontal foraminate plate spaced from said bottom dividing said housing into an upper air-sealed combined receiving and filter chamber, and a bottom chamber, a pair of tubular ducts projecting forwardly from the upper portion of said front wall, an air-lift attached to the outer end of one of said ducts, a siphon leg extending upwardly from said bottom chamber and attached to the inner end of the other tubular duct, a siphon delivery leg attached to the outer end of the last said duct, an air vent for said upper chamber and a pressure control valve for said duct.

11. A filter of the class described comprising a housing, means on said housing for supporting the same upon an aquarium, a filter chamber in said housing, filter material in said chamber, an air lift for delivering the water to be cleansed into said housing, an air sealing top closure for the portion of said housing into which said air-lift discharges, whereby the air pressure developed therein by said air-lift will force the water through said filter material, and means for delivering the filtered water to the aquarium.

12. A filter as set forth in claim 11, in combination with means for regulating the air pressure developed therein.

References Cited in the file of this patent

UNITED STATES PATENTS

| | | |
|---|---|---|
| 2,510,427 | Soucie | June 6, 1950 |
| 2,653,908 | Rodda | Sept. 29, 1953 |
| 2,665,250 | Willinger et al. | Jan. 5, 1954 |
| 2,737,490 | Lambertson | Mar. 6, 1956 |